Figure 1:
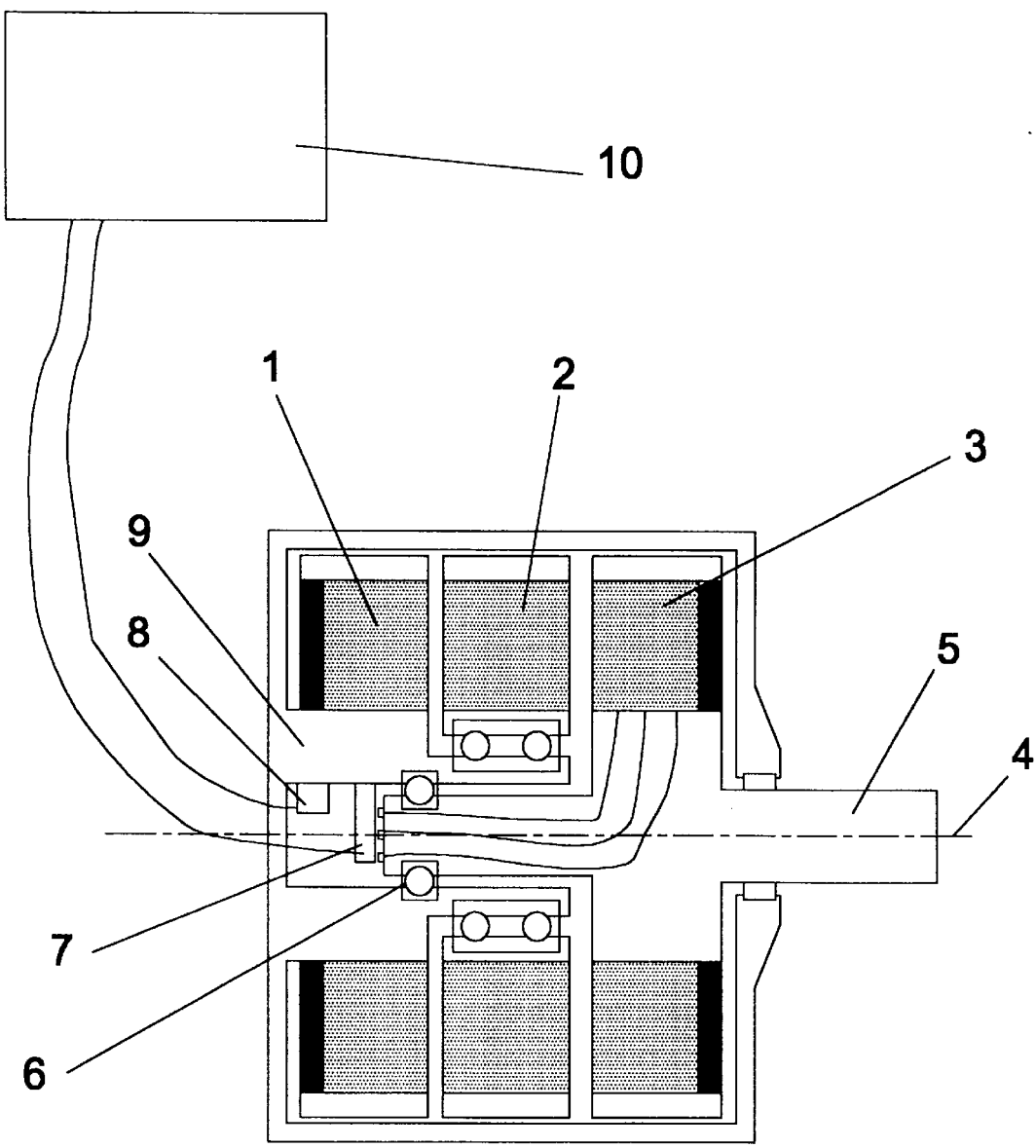

United States Patent [19]
Thomassen

[11] Patent Number: 5,994,811
[45] Date of Patent: Nov. 30, 1999

[54] ELECTRIC MOTOR

[75] Inventor: Karl A. Thomassen, Kristiansund, Norway

[73] Assignee: Electret AS, Norway

[21] Appl. No.: 09/091,754
[22] PCT Filed: Dec. 20, 1996
[86] PCT No.: PCT/NO96/00296
  § 371 Date: Jun. 22, 1998
  § 102(e) Date: Jun. 22, 1998
[87] PCT Pub. No.: WO97/23940
  PCT Pub. Date: Jul. 3, 1997

[30] Foreign Application Priority Data

Dec. 22, 1995 [NO] Norway ..................................... 955282

[51] Int. Cl.$^6$ .................................................. H02K 47/18
[52] U.S. Cl. .......................... 310/160; 310/114; 310/115; 310/212; 310/103; 318/154; 318/156; 318/254
[58] Field of Search ..................................... 310/160, 114, 310/115, 212, 103; 318/154, 156, 254

[56] References Cited

U.S. PATENT DOCUMENTS

| | | | |
|---|---|---|---|
| 4,532,447 | 7/1985 | Cibie | 310/114 |
| 5,144,180 | 9/1992 | Satake | 310/212 |
| 5,525,851 | 6/1996 | Kumamoto | 310/114 |

FOREIGN PATENT DOCUMENTS

| | | |
|---|---|---|
| 2 612 704 | 9/1998 | France . |
| 43 41 128 | 6/1994 | Germany . |
| 2 264 812 | 9/1993 | United Kingdom . |

Primary Examiner—Nestor Ramirez
Attorney, Agent, or Firm—Jones & Askew

[57] ABSTRACT

An electric motor comprising two separate and coaxially spaced armatures as well as a magnet-equipped rotor arranged between the two armatures. One armature is fixed to a motor housing being a static armature, while the other armature is free to rotate, having the motor output shaft as a central and integral part thereof. The rotor operates as a rotor for both armatures having magnet pole pairs on both sides for interaction with each respective armature. Thus, the motor comprises two part-motors having a common rotor.

7 Claims, 5 Drawing Sheets

ELECTRIC MOTOR

The present invention relates to electric motors.

A problem in connection with ordinary electric motors is that they are not particularly efficient when the drive shaft operates at a low rpm. E.g. in lifting cranes it would be a great advantage having motors with the characteristic of operating efficiently at low speeds, and which easily and efficiently might provide a change of the rotation direction while maintaining a strong torque through the neutral position.

From German Offenlegungsschrift nos. 2237099 and 2928770 are known torque converters which make use of a self-induced voltage created by having the shaft connected to a drive motor and one part of the converter operating as a generator, while another part operates as a motor. By regulating the voltages between the two parts, one achieves to be able to control the rpm as well as the torque of the output shaft, independent of the drive motor rpm. However, in these cases one depends entirely on a drive motor connected to the generator part of the torque converter. The converter units are in reality designed as a replacement for hydraulics solutions.

U.S. Pat. No. 4,532,447 also discloses a torque converter or a speed variator. This converter consists of an outer fixed armature (stator), an intermediate rotor and a rotor arranged centrally therein. The intermediate rotor is equipped with two sets of windings, the outer winding interacting with the outer, fixed armature and the inner winding influencing the inner rotor.

It appears from the patent that the converter operates as a torque variator by connecting the inner rotor to a drive unit (e.g. a car engine) and connecting the intermediate rotor to a gearbox. Control of rpm and torque is effected in a very complicated manner, by controlling continuously that opposite poles are in correct mutual position during operation. Further, there seems to be a limitation on the power magnitudes to be transferred without making the construction relative voluminous, since the power to be transferred, is dependent on the size of the windings on the intermediate rotor.

British patent application, publication no. GB-A-2,271,025 discloses an electric motor having characteristics somewhat related to the characteristics of the present invention. The prior art motor is constructed from two stators (armatures) fixedly mounted in a motor housing, with an annular rotor arranged between the two fixed stators. The rotor consists of several small permanent magnets or magnetizable units (i.e. coils) fastened to the main shaft by means of arms or "spokes".

The British patent application further describes that every coil or magnet is rotatable about its respective axis and absorbs a torque which is created when a voltage is supplied to the outer stator, so that the shaft does not rotate. By supplying a voltage to the inner stator and/or the rotating units, the rotation of each rotating unit will be braked and cause the shaft to start rotating.

The prior art motor utilizes variations of frequency or voltage to the two armatures in order to control the speed.

However, the rotor is fixedly mounted in the shaft, and is composed from several detached small rotors rotating between the armatures and being peripherally (radially) placed in relation to the shaft. A voltage can be supplied to the small rotors via slip rings or similar. The design with several coils or magnets rotating about respective axes between the armatures and radially in relation to the shaft, and being fastened on arms fixed to the shaft, makes the construction relatively complicated, and it seems that the motor size will be relatively voluminous if large power magnitudes are to be transferred.

German Offenlegungsschrift DE 4341128 discloses a cylindrically shaped motor having a free-running rotor, so that the motor is a "double motor" where the output shaft rpm may appear as a difference between the rpm's of two part motors. However, the motor is restricted to a cylindrical embodiment, and is obviously not intended manufactured for utilization in an rpm range around zero. At the outset this prior art motor is designed for high output shaft speeds.

Thus, there exists a need for an electric motor with the characteristics that the rpm can be regulated to a standstill, that a full torque can be exerted at a standstill for the output shaft, and that the motor output shaft can change its sense of rotation without having to stop the motor and thereafter start it again.

The present invention is an electric motor which satisfies the needs stated above, and the motor in accordance with the invention is defined precisely in the appended patent claim 1. Further specialized embodiments of the invention appear from the remaining patent claims.

Figure 2:
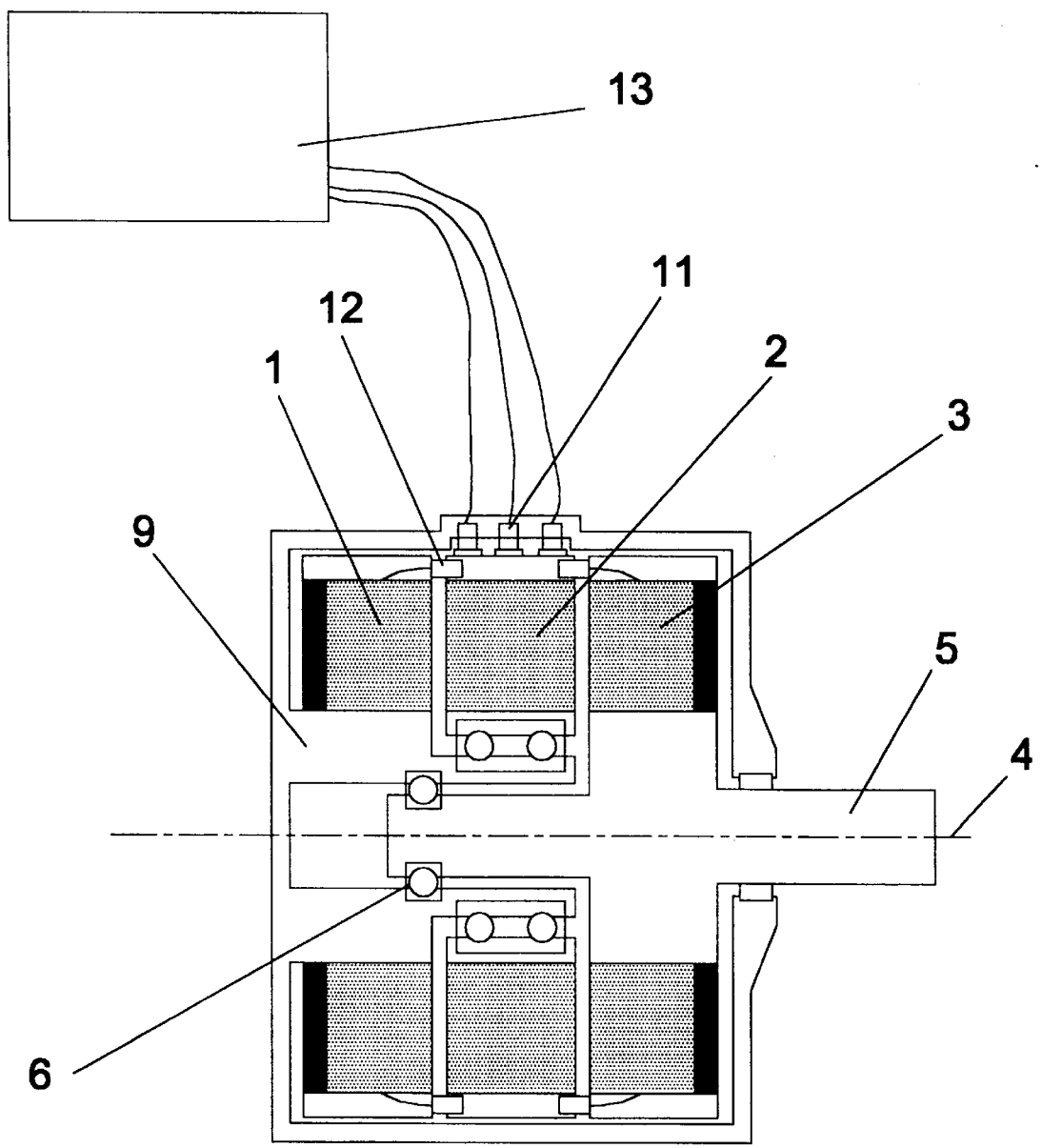
Figure 3:
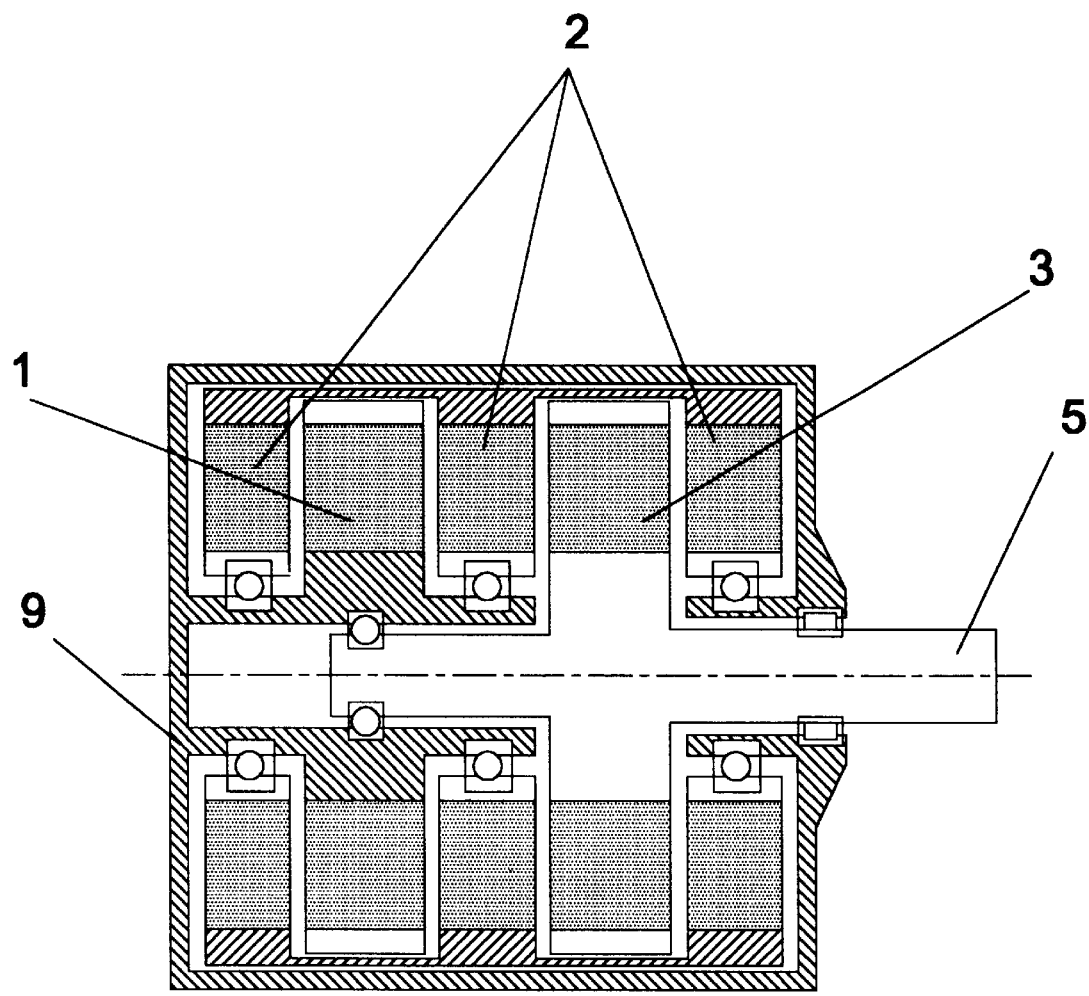
Figure 4:
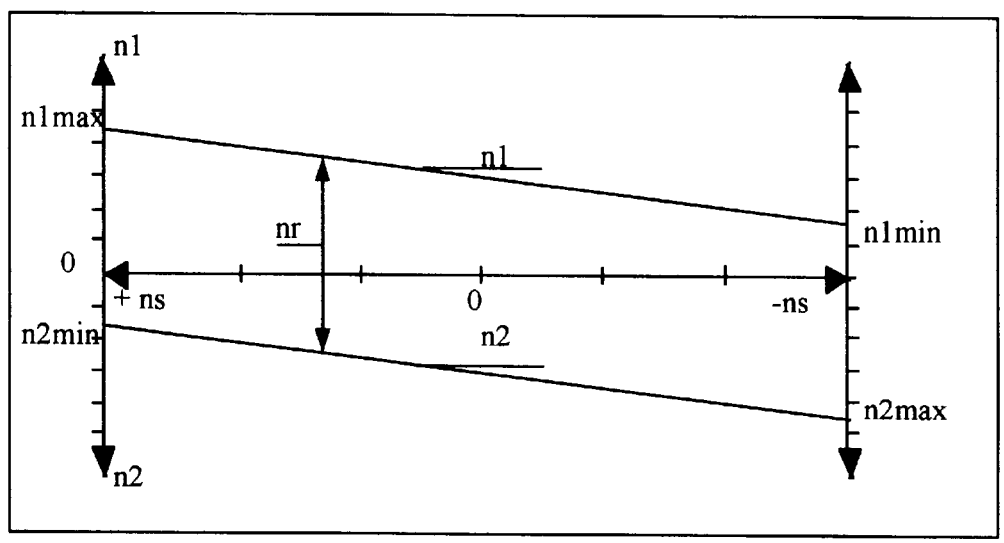
Figure 5:
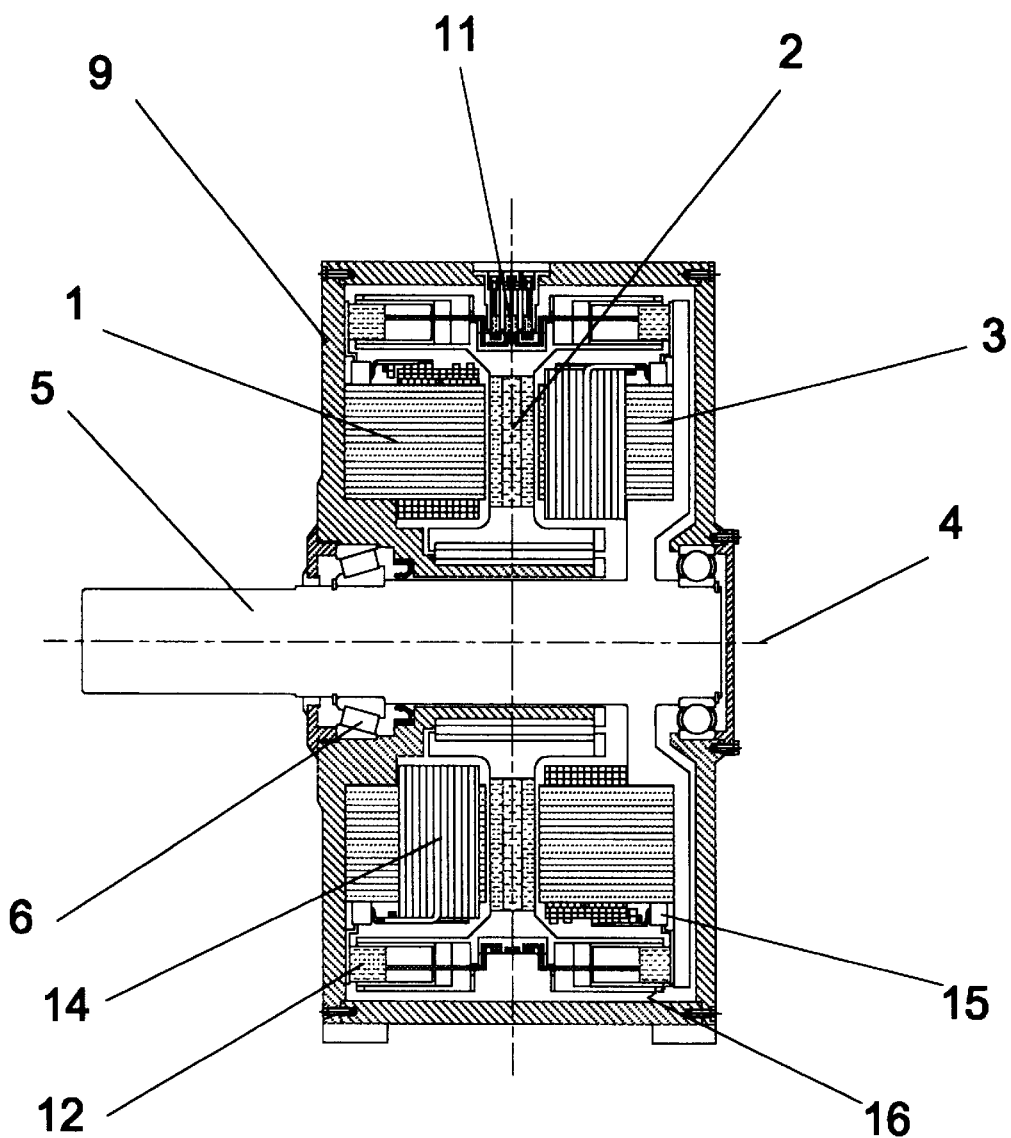

In the following the invention shall be illuminated more closely by a detailed mention of some embodiment examples, and it is at the same time referred to the appended drawings, where FIG. 1 shows a motor in accordance with the invention, in the form of a disc-shaped AC motor, in longitudinal section, FIG. 2 shows in a corresponding manner a disc-shaped AC motor constructed in accordance with the invention, FIG. 3 shows a disc-shaped motor with an axially extended rotor part, FIG. 4 shows in diagrammatic form the relation between the different rpm's for the two part motors, and FIG. 5 shows an embodiment of the motor in accordance with the invention in closer detail.

In FIG. 1 is shown schematically a first embodiment of a motor in accordance with the invention, in the form of a disc-shaped AC motor, shown in axial longitudinal section. "Disc-shape" here refers to the fact that the fixedly mounted armature 1, the rotating pole wheel (or rotor) 2 and the rotatable armature 3 have the shape of discs situated side by side and have a common axis 4, which is the axis about which the rotor 2 and the rotatable armature 3 rotate.

As previously mentioned, the armature 1 is fixedly mounted to the motor housing 9, and the windings or coils of this armature receive an AC voltage from a frequency converter 10 via a connection box 8. Correspondingly, another per se independent part of the frequency converter 10 supplies in a corresponding manner an AC voltage to the windings/coils on the rotatable armature 3 via brushes and slip rings 7.

The rotatable armature 3 has in its center a shaft 5 which is the motor output shaft, and the shaft 5 runs on ball or roller bearings 6 attached to the motor housing 9. The rotatable pole wheel 2 is in principle equipped with permanent magnets for interaction with the fixedly mounted armature 1 on one side, and on the other side the rotatable armature 3. Thus, the motor comprises in principle "two part motors", the rotor 2 being a rotor both in the part motor system constituted by armature 1/rotor 2, and in the part motor system constituted by armature 3/rotor 2. The part motor armature 1/rotor 2 is in the following referred to as M1, and the part motor armature 3/rotor 2 is referred to as M2.

The permanent magnets of the free-running rotor may, as is usual within this technical field, equally well be replaced by coils, however magnetizing current must then be supplied to the rotor via brushes/slip rings. The permanent magnets or the coils on rotor 2 form pole pairs on each respective side of the rotor. The rotor or pole wheel 2, which thus is situated between armatures 1 and 3, functioning as a rotor for both these armatures at the same time, rotates on a roller or a ball bearing attached to a central and inward protruding part of the motor housing 9, but it may also be supported by and rotate on a roller or ball bearing about the shaft 5.

By applying a voltage to M1, thereby bringing the free-running rotor 2 into rotation with a certain angular speed ω1, and simultaneously applying a voltage to M2 to provide to the rotor 2 the same rotation speed (ω2=ω1) in relation to the rotatable armature 3, however in the opposite rotation sense, the rotation speed ωs of the shaft will be equal to zero, and the torque of the shaft 5 will be determined by the power magnitudes and the rotation speeds for M1 and M2.

By changing the frequency from the frequency converter 10 in order to change the velocity, either regarding one, ω1 or ω2, or for both, ω1 and ω2 at the same time, one will in accordance with the invention achieve that the shaft is brought to rotation with a speed ωs which will be equal to the difference between the speeds ω1 and ω2. The shaft power will be equal to the difference of the power magnitudes for M1 and M2.

By changing velocities ω1 and ω2 in parallel in such a manner that the sum of the rpm's is constant, one will in accordance with the invention achieve that the shaft speed ωs is changed to a speed which is equal to the difference between speeds ω1 and ω2, at the same time as the shaft torque will adapt to the load torque at the rpm in question.

It is also possible to change the speeds ω1 and ω2 in such a manner that one obtains that the rotation speed of the shaft will be constant during the change and determined by the difference between the rotation speeds ω1 and ω2, and the torque of the shaft will all the time be determined by the load torque.

Many of the same considerations stated above, are valid also regarding the embodiment appearing in FIG. 2, which shows a similar construction as in FIG. 1, and where the same reference numerals as in FIG. 1 are used for corresponding details, however this is a DC motor receiving its drive voltage from a voltage regulator 13. The voltage is in this case supplied via brushes and slip rings 11 to the rotor 2, and further via brushes/commutator 12 to the windings of the two armatures 1 and 3. This is a disc-shaped motor embodiment, analogous to the motor shown in FIG. 1.

The operation of the DC motor in FIG. 2 also takes place by analogy with what is described regarding the AC motor, but instead of changing the output frequency of a frequency converter, the output voltages from the voltage regulator 13 are changed in order to change the rotation speeds ω1 and ω2 for M1 and M2 respectively (quite similar designations being used as in the AC motor case).

In FIG. 3 is shown a variant of the disc motor concept mentioned above both in the form of a DC and AC motor. The motor appearing in FIG. 3 is as a starting point similar to the previously shown embodiments, but in particular the rotor 2 is different, The rotor is in this case shown as a substantially three-part construction, having one section between the two armatures 1 and 3 and one section outside each respective armature, while the three rotor sections are interconnected by cylindrical parts situated radially outside the two armatures. With such a design, where each of the three rotor sections has magnets with pole-pairs adapted for interaction with the armature windings, on those sides of the rotor sections that face the armatures, higher power can be obtained without having to increase the motor diameter. Electric connection details are not shown in FIG. 3, however these can be designed in a corresponding manner as shown above, for DC and AC motor operation respectively.

FIG. 4 shows in a diagram the relations between the rpm values. The shaft rpm equals the difference between rpm's n1 and n2. The sum of the rpm's n1 and n2 is defined as the relative rpm of the motor, and will be constant when the rpm's are regulated in parallel. Mathematically the rpm relations can be expressed as follows:

$$ns = n1 - n2 \qquad nr = n1 + n2 = \text{constant}$$
$$n1 = (nr + ns)/2 \qquad n2 = (nr - ns)/2$$

where:

$$ns = \text{shaft rpm} \qquad nr = \text{relative rpm of motor}$$
$$n1 = \text{rpm } M1 \qquad n2 = \text{rpm } M2$$

The torque will be the same throughout the motor, so that: Tds=Td1=Td2 and mathematically the shaft power of the motor can be expressed as follows:

$$Ps = Tds \times \omega s = Tds \times (\omega 1 - \omega 2)$$
$$= (Td1 \times \omega 1 - Td2 \times \omega 2) = P1 - P2$$

where:

$$Ps = \text{motor shaft power}$$
$$Tds = \text{shaft torque}$$
$$\omega s = \text{shaft angular speed}$$
$$\omega 1 = \text{angular speed } M1 \qquad \omega 2 = \text{angular speed } M2$$
$$P1 = \text{power } M1 \qquad Td1 = \text{torque of } M1$$
$$P2 = \text{power } M2 \qquad Td2 = \text{torque of } M2.$$

In general the situation will be that when Ps>0 (when e.g. lifting a load), the motor part (e.g. M1) having the highest velocity, will always run as a motor, and the other part (e.g. M2) will always run as a generator, dependent on the torque direction on the output shaft.

The net power consumption will then be:
Pnet=(P1/η1−P2×η2)ηm
where:
η1=electrical efficiency of M1
η2=electrical efficiency of M2
ηm=mechanical efficiency of the motor.

In general the situation is that an electromotor in operation generates heat due to electrical and mechanical loss processes, i.e. due to conductive losses and iron losses as well as friction. Cooling of the motor can be provided by having a fan mounted on the pole-wheel/rotor 2, which always rotates during operation, also at a shaft standstill, which fan drives a cooling air stream through the motor.

A motor in accordance with the invention will for example at a standstill and full torque load on the output shaft, be able to obtain complete replacement of heated air generated by electrical and mechanical loss processes.

It is also to be noted that the motor in accordance with the invention quite well may be run in such a manner that one part motor, e.g. M1, is run at a constant speed, while the other motor (in this case M2) is speed regulated. Hence a simplified regulating scheme can be achieved. The shaft rpm will, as always, be equal to the difference between the rpm's for each respective part motor. The power and the torque will be regulated in the same manner as when regulating both rpm values.

In FIG. 5 is shown an embodiment of the motor in accordance with the invention indicated in closer detail, i.e. an embodiment such as shown schematically in FIG. 2.

In the same manner as previously, reference numeral 1 refers to a fixed armature, wherein the coil cores may consist of electro-iron sheets or iron powder. The coil windings are indicated by reference numeral 14. The fixed armature 1 is attached to motor housing 9, The freely rotating pole wheel 2 (rotor) has permanent magnets. The rotating armature 3 has a corresponding construction as the fixed armature 1, however is attached to a central and outward protruding shaft 5, which is supported in the motor housing via roller or ball bearings 6. Both armatures and the rotor are constructed around a common axis 4. Reference numeral 11 refers to brushes and slip rings for a voltage to the coil windings via brushes/commutator, i.e. the voltage enters the rotor 2 and further via brushes 12 and commutators 16 to the coil windings of both armatures. Reference numeral 15 refers to a junction box for conductors from commutator to coil windings. it is to be noted that the rotor 2 has been given a design with a suitable extension peripherally for adaptation to the function of mediating further a voltage to the coil windings of the armatures, as well as a suitable extension centrally for obtaining stable support and rotation.

I claim:

1. An electric motor, comprising:

two separate, substantially circular-symmetrically shaped and coaxially spaced armatures (1,3) with respective armature windings, a magnet- or elecromagnet-equipped rotor (2) arranged coaxially in relation to the two armatures (1,3), said rotor (2) being supported free-running in the motor, where one of said armatures (1) is fixed to a surrounding motor housing (9) to constitute a static armature (1), and an output shaft (5) arranged coaxially with the rotor (2) and the armatures (1,3):

characterized in that:

the motor is a disc motor where the armatures (1,3) are substantially disc-shaped, having substantially the same outer diameter and are placed standing in parallel;

the rotor (2) is arranged at least between the two armatures (1, 3);

the rotor (2) has magnet pole-pairs arranged on the respective sides thereof facing toward the armatures (1, 3);

the other armature (3) is fixed to the output shaft (5); and the motor is operative so that the output shaft (5) is able to take a torque load in a standstill situation where equal drive voltages are supplied to both armatures (1,3) so that only rotor (2) is rotating.

2. Electric motor in accordance with claim 1, in an AC embodiment, characterized in that the armature windings on one of the armatures (1, 3) are connected to a first means (10) for supplying a constant or frequency variable electric AC drive voltage, and that the other armature (1, 3) is connected to a second means (10) for supplying a frequency variable electric AC drive voltage, the armature (3) on the output shaft (5) being connected to its supply means via brushes and slip rings (7).

3. Electric motor in accordance with claim 1, in a DC embodiment, characterized in that the armature windings of both the static armature (1) and the rotatable armature (3) are connected via commutator/brush means (12) to conductors on the rotor (2), said conductors further being connected via slip ring/brush means (11) to means (13) for supplying drive voltages to the armatures (1, 3), where at least one of the drive voltage supply means (13) is a voltage regulator for supplying a variable voltage.

4. Electric motor in accordance with claim 1, characterized in that the rotor (2) is designed with three substantial sections of which one section is situated between the two armatures (1, 3) and the two remaining sections are situated axially outside respective ones of the two armatures (1, 3), the three rotor sections being interconnected by cylindrically shaped parts situated radially outside the two armatures (1, 3).

5. An operating method for an electric motor of the type indicated in claim 1, where the rotation speed of the rotor (2) and the rotation speed of the rotating armature (3) in relation to the rotor (2) are in opposite rotation directions, characterized in that the frequency or the voltage for the armature windings on each of the two armatures (1, 3) is changed in such a manner that the two said rotation speeds are changed in parallel and the sum of the rotation speeds is held constant, whereby the output shaft (5) rotation speed is changed as the difference between the two first mentioned rotation speeds.

6. Operating method for an electric motor of the type indicated claim 1, characterized in that the frequency or the voltage for the armature windings on each one of the two armatures (1, 3) is changed in such a manner that the rotation speed of the rotor (2) and the rotation speed of the other armature (3) in relation to the rotor (2) are changed, while the difference between them is held constant, whereby the output shaft rotation speed is held constant.

7. Operating method for an electric motor of the type indicated claim 1, characterized in that the voltage magnitude respectively frequency is held constant for one of the armatures (1, 3), while the voltage for the other of the armatures (1, 3,) is regulated in frequency or magnitude, whereby the output shaft (5) rpm is changed as the difference between a constant and an adjustable rpm.

* * * * *